April 3, 1951   S. D. LAPHAM   2,547,329
INDUSTRIAL TRUCK
Filed Nov. 8, 1947   2 Sheets-Sheet 1

Inventor:
Sidney D. Lapham
By Oswald H. Milmore
His Attorney

April 3, 1951  S. D. LAPHAM  2,547,329
INDUSTRIAL TRUCK
Filed Nov. 8, 1947  2 Sheets-Sheet 2

Inventor:
Sidney D. Lapham
By Oswald H. Milmore
His Attorney

Patented Apr. 3, 1951

2,547,329

UNITED STATES PATENT OFFICE 2,547,329

INDUSTRIAL TRUCK

Sidney D. Lapham, Contra Costa County, Calif.

Application November 8, 1947, Serial No. 784,819

14 Claims. (Cl. 214—82)

This invention relates to material handling equipment and is, more particularly, concerned with a device for loading and discharging materials from a supporting platform, such as the tine of a fork truck, and with an improved truck platform provided with such a loading and discharging device. While the disclosed construction is intended particularly for use with a fork lift truck, i. e., one having a load handling platform comprising a fork which is movable by power mechanism to any desired elevation at which the load is to be taken on or discharged, the invention is not limited thereto and may be used in conjunction with lift trucks having continuous platforms, and/or with trucks in which the platform is not vertically movable.

The principal object of the invention is to provide an industrial truck suitable for the handling of boxes, crates, drums, barrels, and the like, which has a reciprocable loading and unloading element (hereinafter, for convenience, referred to as a loading carriage) provided with tensile load-engaging element, such as a hook, and with a plug piece movable with respect to the load-engaging element so as to cover it during certain phases of the operation, and to expose it during other phases of the operation, whereby the tensile load-engaging element may engage the object to be loaded and pull it onto the supporting platform when the loading carriage is moved inwardly, and is covered by the plug piece to permit the said object to be pushed off of the platform when the loading carriage is moved outwardly.

A further object is to provide a loading carriage of the type described wherein the tensile load-engaging element is adjustable between a load-engaging position and a load-disengaging position and is provided with a mechanism for automatically moving the said element to the load-disengaging position before the plug covers the said element.

Another important object of the invention is to provide an industrial truck which may be used to lift the transport pallets having skids or cleats providing a space below the pallet and the ground, or to lift and transport boxes, crates, drums, barrels, or the like, either from unloading ways supporting such objects from the ground, or directly from the ground, carrier, or pallet.

A specific object is to provide a loading carriage for loading platforms having a vertically movable hook which is automatically moved into engaging position during one phase of the operation of the loading carriage to engage a projection portion of the object to be loaded onto the platform, and which is automatically moved into disengaging position during another phase of the operation of the loading carriage to release such object and permit it to be pushed off of the platform. Ancillary thereto, it is an object to provide an improved loading carriage of the type described having a reciprocable plug for covering the movable hook and for preventing its engagement with the object on the platform during the unloading phase, provided with a latch and with spring means for automatically retracting the plug to expose the jaw of the hook during the loading phase.

With the foregoing and other object in view, which will become apparent from the following description, reference is made to the drawings forming a part of this specification illustrating a preferred embodiment of the invention, wherein.

Figure 4:
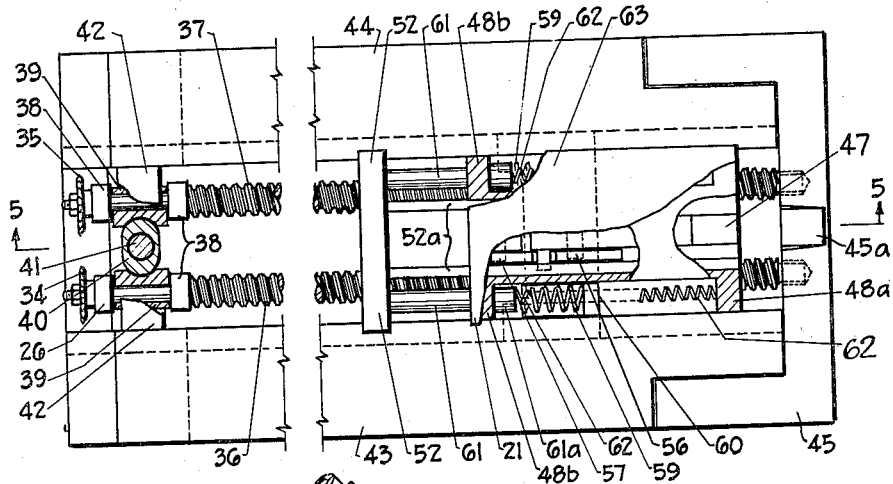
Fig. 4 is an enlarged plan view of one of the forks, the rear cross braces and supporting structure being omitted.
Figure 5:
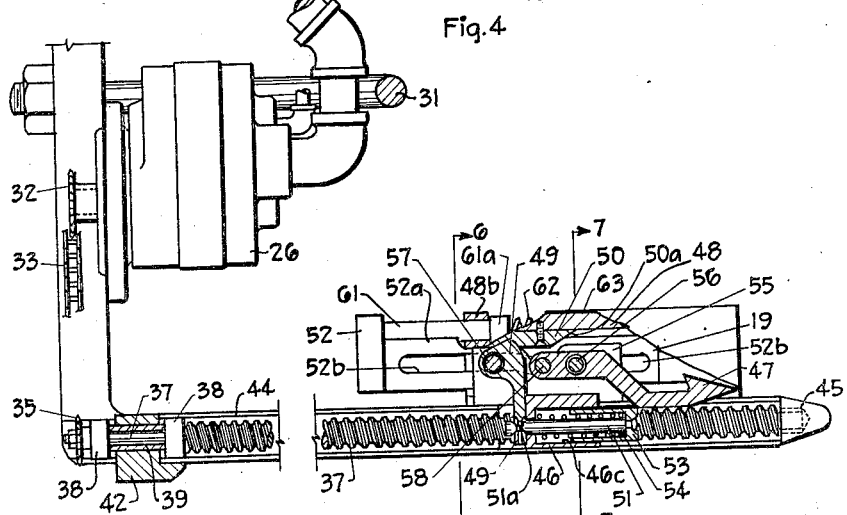
Figures 6, 7:
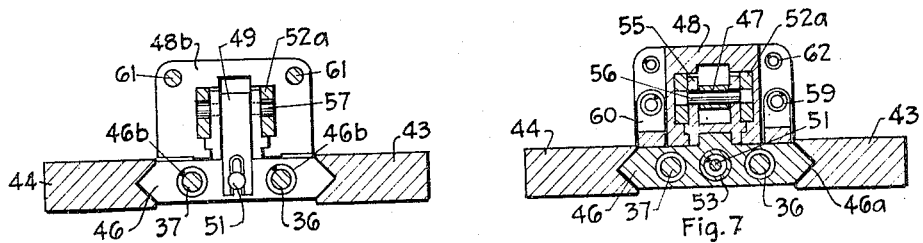

Fig. 5 is a vertical longitudinal sectional view taken on line 5—5 of Fig. 4; and Figs. 6 and 7 are vertical transverse sectional views taken on lines 6—6 and 7—7, respectively, of Fig. 5.

Figure 1:
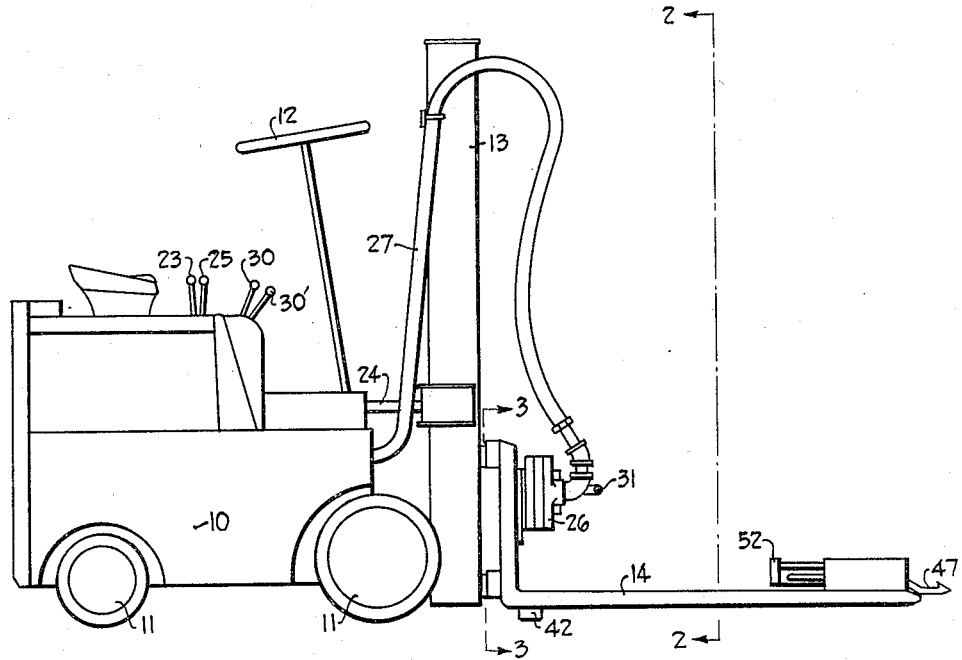
Fig. 1 is a side elevation of a fork lift truck constructed according to the invention.
Figure 2:
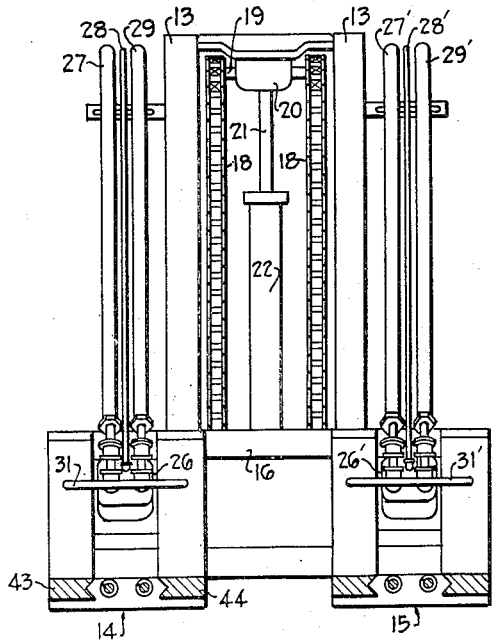
Fig. 2 is a sectional front elevation view taken on line 2—2 of Fig. 1.

Referring to Figs. 1 and 2, the invention is illustrated as applied to a conventional commercial motor truck 10 having wheels 11, steering wheel 12, and the usual clutch, brake and other accessories, not shown. The truck carries a vertical frame comprising guides 13 providing trackways for rollers (not shown) journalled on rearwardly extending arms fixed to the vertically movable load platform. The load platform, in the embodiment shown, consists of a fork made up of two forwardly extending tines 14 and 15 (each of which comprises two bars forming between them a guideway for the loading carriage, as described hereafter) bent upwardly at their rear ends and there connected by transverse bars 16 and 17. The forked load platform is supported vertically by means of roller chains 18 operating in sprockets fixed at opposite ends of a shaft 19 journalled in a housing 20; one end of each chain 18 is fixed to the platform and the other end is fixed to the frame carrying the guides 13. The housing 20 is vertically slidable within the vertical guides 13 and may be raised or lowered by a piston 21 mounted within a cylinder 22. Power for driving this piston is provided by the truck engine, which is coupled to a pump providing a hydraulic fluid under pressure. This fluid flows to the cylinder 22 through a valve controlled by a valve lever 23. The guides 13 are pivotally connected at the bottom to the truck chassis to permit the guides to be tilted forward or backward by means of a piston rod 24 connected to a piston slidable within a horizontal cylinder (not shown). The flow of hydraulic fluid to the latter cylinder is controlled by a valve having a valve lever 25. The levers 23 and 25, in their intermediate position, prevent the flow of fluid to their respective cylinders, and in their extreme positions establish the proper hydraulic connections between the cylinders and the source of fluid pressure and the return line to move the pistons in the desired directions. The construction and operation of such guide frames and hydraulic means for lifting and lowering the load platform, and for tilting the guides being, per se, well known and not a part of this invention, further details thereof are thought to be unnecessary in this specification. The instant invention is, moreover, not limited to trucks having lifting and tilting arrangements of the type described.

Each fork tine is provided with a loading carriage, mounted for reciprocation along the tine. Each tine has a reversible hydraulic motor 26 or 26′, connected to its loading carriage through a chain drive and lead screws, to be described. The hydraulic motors are separately controlled from the truck body so as to permit the independent operation of the loading carriages on the two forks. For operation and control each motor is connected to the truck hydraulic system by three flexible conduits 27, 28 and 29 (or 27′, 28′ and 29′) extending over supports on the vertical guides 13. The small conduits 28 and 28′ are return lines and are connected to the low pressure fluid supply tank. The larger conduits 27 and 29 (as well as 27′ and 29′) are connected through control valves to the source of high pressure fluid. Such valves are provided with levers 30 and 30′, mounted side by side on the truck and arranged as follows: The right hand lever 30 is connected to the valve regulating the flow of high pressure fluid through the conduits 27 and 29 to the motor 26 on the right fork tine 14, and is arranged to prevent the flow of fluid (and operation of the motor) when in its intermediate position, to supply fluid through one of the large conduits so as to advance the loading carriage when the lever is in its forward position, and to supply fluid through the other of the large conduits so as to retract the loading carriage when the lever is in its rearward position. The left hand lever 30′ is similarly connected to the valve regulating the flow through the conduits 27′ and 29′ to the motor 26′ on the left fork tine 15, so that the forward or backward motion of the lever causes the left loading carriage to operate in the direction of the valve lever motion. A guard bar 31 or 31′ is mounted on each fork to protect the motor 26 or 26′ from injury by objects on the forks.

Figure 3:
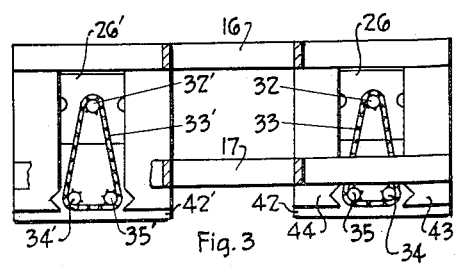
Fig. 3 is a sectional view taken on line 3—3 of Fig. 1.

Referring to Figs. 3 and 4, the motors 26 and 26′ are provided with drive sprockets 32 and 32′, respectively. A roller chain 33 bridles the sprocket 32 and sprockets 34 and 35 mounted at the ends of lead screws 36 and 37, respectively. A similar roller chain 33′ bridles sprockets 34′ and 35′ on the left fork tine 15. The two fork tines being of identical construction, only the right tine 14 will hereinafter be described.

The pair of threaded lead screws 36 and 37 in the tine 14 are provided at their rear ends with thrust bearings 38, there being two such bearings on each screw, spaced apart by an equalizer bushing 39. The equalizer bushings have curved recessed portions facing each other and adapted to receive the ends of an equalizer rocker 40 pivotally mounted on a vertical equalizer rocker pin 41, the latter being fixed at its upper and lower ends in an equalizer housing 42 connected to the tines. The equalizer housing is hollow to contain the equalizer bushings 39, the rocker and rocker pin, and has lower transverse flanges bolted to the lower sides of the parallel sections 43 and 44 forming the fork tine 14; its hollow, upstanding portion is provided with wedge-shaped projections fitting into the grooves formed in the sides of the sections 43 and 44. The forward ends of the lead screws are journalled in a nose piece 45 which is bolted to the forward ends of the sections 43 and 44. The upper surface of the nose piece is sloped downwardly toward the front and has a notch or recess 45a at the center for accommodating the hook, to be described.

The loading carriage shown more particularly in Figs. 4–7, comprises the following main parts: a lead screw carriage 46; a hook 47 pivotally attached to the lead screw carriage; a plug piece 48 slidably mounted over the lead screw carriage so as to cover the nose of the hook in its forward position and expose it in its rearward position; a latch assembly comprising a latch 49, keeper 50 and release button 51; a cam slide 52; and springs as described hereafter.

The lead screw carriage 46 has lateral wedge-shaped projections 46a fitting in corresponding grooves in the faces of the parallel fork sections 43 and 44. These grooves form a guideway in which the carriage can be reciprocated. The carriage 46 is, further, provided with internally threaded holes 46b for coaction with the lead screws 36 and 37, whereby the carriage will be advanced or retracted along said guideway as the screws are rotated. During such rotation binding on the carriage is prevented by the action of the equalizer rocker 40, which transmits the axial thrust of the lead screws to the supporting structure and permits some axial movement of the lead screws until the loads are equalized. The lead screw carriage 46 is further provided with a forwardly opening recess 46c, located between the holes 46b, this recess has a sliding fit with a cylindrical skirt 53 rigidly attached to the forward end of the release button 51. The recess has a smaller hole at the rear to permit the shank of the release button 51 to extend therethrough. A release button spring 54 urges the release button forwardly to the extent permitted by the latch 49, the lower, bifurcated end of which engages the spherically-shaped surfaces on the shank of the release button on either side of the narrow neck 51a.

The carriage 46 has a pair of longitudinal vertical walls 55 screwed on its upper surface for supporting a hook pin 56 and a latch pin 57, which pins extend transversely and are secured in holes in the walls. The hook 47 and latch 49 are pivotally mounted on the carriage 46 by these pins and walls. The upper edges of the walls 55 are recessed intermediate to the pins 56 and 57 to permit a transverse taper pin 58, rigidly fixed to the rear end of the hook and extending laterally beyond the walls 55, to move vertically when the hook is pivoted about the pin 56. The latch 49 is normally urged in a counter-clockwise direction by the action of the spring 54 and release button 51.

Plug piece 48 is slidably mounted on the carriage 46 so as to cover the nose or barb at the hook 47 when in its forward position (shown in Figs. 4–7) and to expose the barb at the hook when in its retracted position (shown in Fig. 1). It is provided with lateral, vertical flanges 48a and 48b at its forward and rear ends, respectively. The plug piece is constantly urged to its retracted position by a pair of plug springs 59 on opposite sides of the plug piece; the rearward ends of the springs fit into recesses in the forward faces at the flanges 48b and the forward ends bear against spring clips 60 bolted to the carriage 46. Keeper 50 is screwed to the lower face of the top of the plug piece and is curved to fit the outline of the upper end of the latch 49. When the latch is in the position shown in Fig. 5 the plug piece is locked in its forward position against the action of the spring 59. When the latch is rotated in a clockwise direction by the action of the release button 51 the plug piece is released and moved to its retracted position by the action of the springs 59. The inclined surface 50a on the keeper rocks the latch in a clockwise direction against the action of the spring 54 when the plug piece is moved into its forward position in the manner to be described.

The cam slide 52 is slidably mounted on the lead screw carriage and plug piece. It is secured by guide rods 61 screwed to the rear end of the cam slide and extending through holes in the flanges 48b. The cam slide is urged to the rear by means of cam slide springs 62, which are not as stiff as the springs 59. These springs bear against the rearward faces of the flanges 48a, and against the forward enlarged ends 61a of the rods 61. These ends 61a are recessed to retain the springs in position. It will be noted that the rearward movement of the cam slide is limited by the engagement of the enlarged ends 61a with the forward faces of the flanges 48b. The cam slide 52 has a pair of parallel, vertical walls 52a slidably fitting inside of the plug piece 48 and outside of the walls 55. These walls 52a have slots 52b of width to receive the taper pin 58 on the hook and to form a cam surface. It will be noted that the slot 52b has two horizontal portions joined by an inclined portion, and that the rear horizontal portion is higher than at the forward horizontal portion, whereby the taper pin 58 will be raised when the cam slide is in its forward position and lowered when in its rearward position. A cover piece 63 is screwed to the plug piece 48.

*General operation*

With the parts in the position shown in Figs. 4 and 5, to advance the loading carriage and retract the plug piece, the operator moves lever 30 to its forward position, thereby causing hydraulic motor 26 to rotate the lead screws 36 and 37. The lead screw carriage 46 is thereby advanced forwardly, the thrust bearings 38, equalizer bushings 39, equalizer rocker 40, rocker pin 41 and equalizer housing 42 transmitting the thrust to the fork sections and causing the lead screws to do equal work. When the release button 51 engages the nose piece 45 the latch 49 is rotated in a clockwise direction about the latch pin 57, releasing the latch from the keeper 50. Plug piece 48 is thereby freed and is retracted on the ways of the carriage 46 by the action of the plug springs 59, and the barb of the hook 47 is exposed. During the rearward movement of the plug piece the cam slide springs 62 are compressed, and the cam slide is also moved towards the rear. The hook 47, which is in its raised position, will not, however, be moved thereby because the taper pin 58 is riding in the forward, horizontal portion of the cam slot 52b. Continued forward motion of the carriage causes the hook to extend forwardly beyond the nose piece 45, riding over the notch 45a. (See Fig. 1.) When the carriage 46 comes into engagement with the nose piece 45 the motor 26 is stopped, the parts being then in the position shown in Fig. 1 with the hook raised, exposed, and extending beyond the nose piece 45. The motor 26 may be stopped manually by the operator; if not shut off, the engagement of the carriage with the nose piece will cause the hydraulic motor to stall without damage when a moderately powered motor is used. It is, however, also possible to apply electrically or mechanically operated limit safety devices to be applied for stopping the motor when the carriage reaches either end of the fork, such as shown, for example, in U. S. Patents Nos. 1,693,335 or 1,896,543.

When the lever 30 is shifted to reverse the motor 26 from the position shown in Fig. 1, the carriage 46 will be retracted, pulling any object engaged by the hook 47 onto the fork tine 14. During this motion the plug piece 48 remains in its retracted position and the hook 47 is locked in its raised position by the rearward position of the cam slide 52. When the rear face of the cam slide 52 strikes the heel of the fork at the rear end of its motion the springs 59 and 62 are compressed. The cam slide springs 62 being weaker than the plug springs 59, the latter is initially only very slightly compressed and the plug piece 48 continues its rearward movement almost as fast as the carriage 46. As a result the cam slide moves forwardly with respect to the carriage 46 and the inclined portion of the cam slots 52b raises the taper pin 58 and causes the forward end of the hook 47 to drop, through leverage action about the fulcrum pin 56 until the barb of the hook is below the surface of the fork section 43—44. Further retraction of the carriage 46 brings the face of the rear part of the cam slide against the rear face of the plug piece 48, causing the plug piece to stop its rearward motion and compressing springs 59. The hook will then be retracted within the plug piece; the plug piece will be latched in its forward position with respect to the carriage 46 by engagement of the keeper 50 with the latch 49, so that the cycle can be repeated. When the carriage 46 engages the equalizer housing 42, the hydraulic motor 26 is stalled or stopped manually as previously described.

When the motor 26 is again actuated to move the loading carriage forwardly from its rearmost position the cam slide 52 is retracted by the action of the springs 62. This causes the barb of the hook to be raised and locked in its raised position while covered by the plug piece 48. The parts are then again in the relative positions shown in Figs. 4–7.

*Operations for loading and unloading carriers*

To position steel drums, or the like, on a carrier deck, the operator runs the fork fully into the unloading ways of a pallet by maneuvering the truck with the loading carriages fully retracted. Each tine of the fork is positioned under a separate drum. He now can lift two drums from the pallet to carrying position on the fork by elevating the fork by manipulation of the lever 23, and, if desired, by tilting the fork to raise the nose slightly by manipulation of the lever 25. The drums can then be transported to the carrier by the lift truck. When the truck has been maneuvered into the proper position aboard the carrier to spot the drums, the hoist is raised or lowered for proper loading elevation of the drums. The operator can then, by selection of the right or left valve lever 30 or 30', or both, cause the hydraulic mechanism to advance the loading carriage and plug to its most forward position on the fork. As the carriage advances the plug pushes the drum ahead of it to its spot position on the carrier, thereby clearing the fork for the next load. The plugs are then retracted to the heel of the fork as the operator returns the truck to pick up the next load from the pallet.

When unloading steel drums from a carrier, the operator advances the loading carriages to their most forward positions on the fork, thereby exposing the hooks. The operator then adjusts the elevation of the fork so that the hooks can be inserted under the chimes of the drums. The truck is then advanced to force the hook under chime; thereafter the fork is raised slightly until the weight of the drum rests on the hooks. The operator then pulls the drums on to the fork by retracting the loading carriages with the hooks exposed and raised. As the loading carriages are retracted to the heel of the fork the hooks are automatically disengaged from the chimes of the drums and covered by the plug piece. Since the plug pieces are latched in this position, it is now possible to push the drums off the fork with the face of the plug piece for depositing them on the ground, or onto a pallet or other platform.

In the operation just described, the device was used to handle two barrels simultaneously, one on each tine of the fork. The invention may, obviously, be adapted for handling only a single or a greater number of drums, or other objects, such as boxes, crates or the like.

I claim as my invention:

1. A truck platform comprising a load supporting member, a loading carriage mounted on said member for reciprocating movement thereon, a tensile load-engaging element on said carriage, and a plug piece movably mounted on said carriage for covering said load-engaging element in one position of the plug piece and exposing said load-engaging element in another position of the plug piece.

2. A truck platform comprising a load supporting member, a loading carriage mounted on said member for reciprocating movement thereon, a tensile load-engaging element on said carriage, a plug piece movably mounted on said carriage for covering said load-engaging element in one position of the plug piece and exposing said load-engaging element in another position of the plug piece, a latch locking said plug piece in one of said positions, resilient means urging the plug piece to the other of said positions, and means on said platform engageable by said carriage at different positions of the carriage on the platform for releasing said latch and for moving the plug piece to its locked position, respectively.

3. A truck platform comprising a load supporting member, a loading carriage mounted on said member for reciprocating movement thereon, a hook extending forwardly from said carriage, a plug piece slidably mounted for reciprocation on said carriage for covering the barb of said hook in its forward position and exposing said barb in its retracted position, and means for locking the plug in its forward position.

4. In combination with the truck platform according to claim 3, release means on the carriage for unlocking the plug piece by engagement of the release means with a portion of the platform in one position of the carriage on the platform, and resilient means urging the plug piece to its retracted position.

5. A truck platform comprising a load supporting member, a loading carriage mounted on said member for reciprocating movement thereon, power drive means for reciprocating said carriage on said supporting member, a tensile load-engaging element movably mounted on said carriage and having a load-engaging position and a load-disengaging position, and means for actuating said load-engaging element for movement between said positions.

6. A truck platform comprising a load supporting member, a loading carriage mounted on said member for reciprocating movement thereon, a tensile load-engaging element movably mounted on said carriage and having a load-engaging position and a load disengaging position, means for actuating said load-engaging element for movement between said positions, and a plug piece movably mounted on said carriage for covering said load-engaging element in one position of the plug piece and for exposing said load-engaging element in another position of the plug piece.

7. A truck platform comprising a load supporting member, a loading carriage mounted on said member for reciprocating movement thereon, a load-engaging hook pivotally mounted on said carriage about a horizontal axis so that the hook may be positioned either in a load-engaging position with its barb extending above the surface of the load supporting member or in a load-disengaging position with its barb retracted below said surface, slide means on said carriage locking the hook in the load-engaging position in a first position of the slide means and in the load-disengaging position in a second position of the slide means, and resilient means normally urging said slide means to said first position.

8. A truck platform comprising a load supporting member, a lead screw extending longitudinally with respect to said member, and a loading carriage mounted for reciprocating movement on said member, said loading carriage comprising a lead screw carriage in engagement with said lead screw, a load-engaging hook movably mounted on said lead screw carriage so that the hook may be positioned either in a load-engaging position with its barb extending above the surface of the load supporting member or in a load-disengaging position with its barb retracted below said surface, a cam slide on said lead screw carriage for actuating said hook, resilient means urging said cam slide in one direction with respect to said lead screw carriage, said cam slide being engageable with a portion of said platform in one position of the loading carriage for movement of the cam slide in a direction to oppose said resilient means, a plug piece slidably mounted for reciprocation on said lead screw carriage for covering the barb of said hook in its forward position and for uncovering said barb in its retracted position, resilient means urging said plug piece to its retracted position, a latch for locking the plug piece in its forward position, and release means engageable with a portion of said platform for actuating said latch to unlock the plug piece.

9. A truck platform comprising a load supporting frame having a pair of parallel bars, said bars having grooves in their inner faces to form a guide way, a lead screw extending parallel to said bars, and a loading carriage mounted for reciprocating movement on said bars, said loading carriage comprising a lead screw carriage having a body portion in engagement with said lead screws and extending into said grooves, a movably mounted tensile load-engaging element having a load-engaging position and a load-disengaging position, means for actuating said load-engaging element for movement between said positions, and a movable plug piece for covering said load-engaging element in one position of the plug piece and for exposing said load-engaging element in another position of the plug piece.

10. A truck platform comprising a load supporting member providing a guideway, a pair of lead screws extending parallel to said guideway, a thrust bearing on each lead screw, an equalizer rocker pivotally supported from said member intermediate to said lead screws and connected to transmit thrust from said thrust bearings to said member, and a lead screw carriage mounted for reciprocating movement along said guideway in engagement with said lead screw.

11. A truck platform comprising a supporting frame having a pair of parallel bars providing a guideway, a transverse nose piece connecting said bars at their forward ends, an equalizer housing connecting said bars at their rear ends, a pair of lead screws extending parallel to said guideway journalled at their forward ends in said nose piece and at their rear ends in equalizer bushings within said equalizer housing, a pair of thrust bearings on each lead screw in engagement with the ends of said equalizer bushing, and equalizer rocker pivotally mounted on said equalizer housing intermediate said equalizer bushings and in thrust transmitting engagement with said equalizer bushings, a reversible hydraulic motor for driving said lead screws in unison, and a loading carriage comprising a lead screw carriage mounted for reciprocating movement along said guideway in engagement with said lead screws.

12. The truck platform according to claim 11 wherein the loading carriage comprises a load-engaging hook pivotally mounted with respect to the lead screw carriage on a horizontal axis transverse to said guideway so as to have a load-engaging position with its barb extending above the surface of said bars and a load-disengaging position with its barb retracted below said surface, a cam slide slidably mounted on the lead screw carriage in camming relation to said hook for actuating the hook between said positions, a plug piece mounted on said lead screw carriage for reciprocating motion so as to cover the barb of the hook on a covering position and to expose said barb in its uncovering position, a latch locking said plug piece in its covering position, a release pin for said latch engageable with said nose piece for unlocking said plug piece upon engagement of said release pin with the nose piece when the lead screw carriage is moved forwardly, resilient means urging said plug piece to its uncovering position and urging said cam slide to move said hook to its load-engaging position, said cam slide being engageable with a portion of said platform when the lead screw carriage is moved to the rear to stop the movement of the cam slide and move the slide cam relative to the lead screw carriage to move the hook to its load-disengaging position, said plug piece being engageable with said cam slide when the latter is stopped during the rearward movement of the lead screw carriage for moving the plug piece relatively to the lead screw carriage to its covering position.

13. As a subcombination, a loading carriage comprising a lead screw carriage having a threaded portion adapted to engage a lead screw, a pivotally mounted load-engaging hook having a load-engaging position and a load-disengaging position, a cam slide in camming relation to said hook for actuating the hook between said positions, and a movable plug piece for covering the barb of said hook in one position of the plug piece and for exposing said barb in another position of the plug piece.

14. As a subcombination, a loading carriage comprising a lead screw carriage having a threaded portion adapted to engage a lead screw, a load-engaging hook pivotally mounted on said lead screw carriage having a load-engaging position and a load-disengaging position, a cam slide in camming relation to said hook for actuating the hook between said positions, a plug piece slidably mounted on said lead screw carriage for covering the barb of said hook in its covering position and for exposing said barb in its uncovering position, a latch for locking said plug piece in its covering position, a release button for unlocking said plug piece, and resilient means urging said plug piece to its uncovering position and the cam slide toward a direction to move said hook to its engaging position.

SIDNEY D. LAPHAM.

REFERENCES CITED

The following references are of record in the file of this patent:

UNITED STATES PATENTS

| Number | Name | Date |
| --- | --- | --- |
| 681,733 | Rasmussen | Sept. 3, 1901 |
| 859,656 | Harbaugh et al. | July 9, 1907 |
| 1,571,627 | Germond | Feb. 2, 1926 |
| 1,580,698 | Stagg | Apr. 13, 1926 |
| 1,693,335 | Damerell | Nov. 27, 1928 |
| 1,896,543 | Gfrorer | Feb. 7, 1933 |
| 1,924,885 | Schreck | Aug. 29, 1933 |
| 2,121,121 | Dempster | June 21, 1938 |
| 2,304,028 | Shipman | Dec. 1, 1942 |
| 2,394,693 | Golrick | Feb. 12, 1946 |